(12) United States Patent
Murata et al.

(10) Patent No.: US 8,349,989 B2
(45) Date of Patent: *Jan. 8, 2013

(54) METHOD OF SEALING A SEMICONDUCTOR ELEMENT WITH AN EPOXY RESIN COMPOSITION

(75) Inventors: Kiyotaka Murata, Kashima (JP); Yoshihisa Sone, Kashima (JP)

(73) Assignee: Air Water Inc., Sapporo-Shi, Hokkaido (JP)

( * ) Notice: Subject to any disclaimer, the term of this patent is extended or adjusted under 35 U.S.C. 154(b) by 1 day.
This patent is subject to a terminal disclaimer.

(21) Appl. No.: 13/151,654

(22) Filed: Jun. 2, 2011

(65) Prior Publication Data
US 2011/0281404 A1 Nov. 17, 2011

Related U.S. Application Data

(63) Continuation of application No. 12/090,173, filed as application No. PCT/JP2006/320581 on Oct. 16, 2006, now Pat. No. 7,994,271.

(30) Foreign Application Priority Data

Oct. 14, 2005 (JP) ................................. 2005-300126

(51) Int. Cl.
*C08G 14/04* (2006.01)
*C08G 59/62* (2006.01)

(52) U.S. Cl. .......... 528/153; 528/86; 528/129; 528/155; 525/523; 525/107; 525/480; 525/481; 525/68; 521/181

(58) Field of Classification Search .................... 525/68, 525/523, 107, 480, 481; 528/153, 86, 129, 528/155; 524/181
See application file for complete search history.

(56) References Cited

U.S. PATENT DOCUMENTS
7,994,271 B2 * 8/2011 Murata et al. ................. 528/153
2003/0069357 A1 4/2003 Kaji et al.

FOREIGN PATENT DOCUMENTS

| JP | 6-136082 A | 5/1994 |
| JP | 9-157353 A | 6/1997 |
| JP | 2000-129092 A | 5/2000 |
| JP | 2000-212259 A | 8/2000 |
| JP | 2000-226498 A | 8/2000 |
| JP | 2001-064340 A | 3/2001 |

OTHER PUBLICATIONS

International Search Report (PCT/ISA/210) issued on Jan. 9, 2007, by Japanese Patent Office as the International Searching Authority for International Application No. PCT/JP2006/320581.
International Preliminary Report on Patentability and Written Opinion issued in corresponding application No. PCT/JP2006/320581 dated Apr. 16, 2008.

* cited by examiner

*Primary Examiner* — Mark Kaucher
(74) *Attorney, Agent, or Firm* — Buchanan Ingersoll & Rooney PC

(57) ABSTRACT

A method of sealing a semiconductor element which involves applying an epoxy resin composition including an epoxy resin and a phenolic resin obtained by reacting phenol, a biphenyl compound represented by the general formula (3) and benzaldehyde to a semiconductor element and curing the composition to seal the semiconductor element:

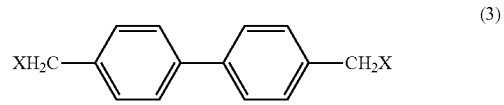

(3)

wherein X in the formula (3) is a halogen, an OH group or an OCH$_3$ group. The molar ratio of the total of the biphenyl compound and benzaldehyde relative to the phenol is from 0.27 to 0.40, and the molar ratio of benzaldehyde/biphenyl compound is from 5/95 to 40/60.

10 Claims, 3 Drawing Sheets

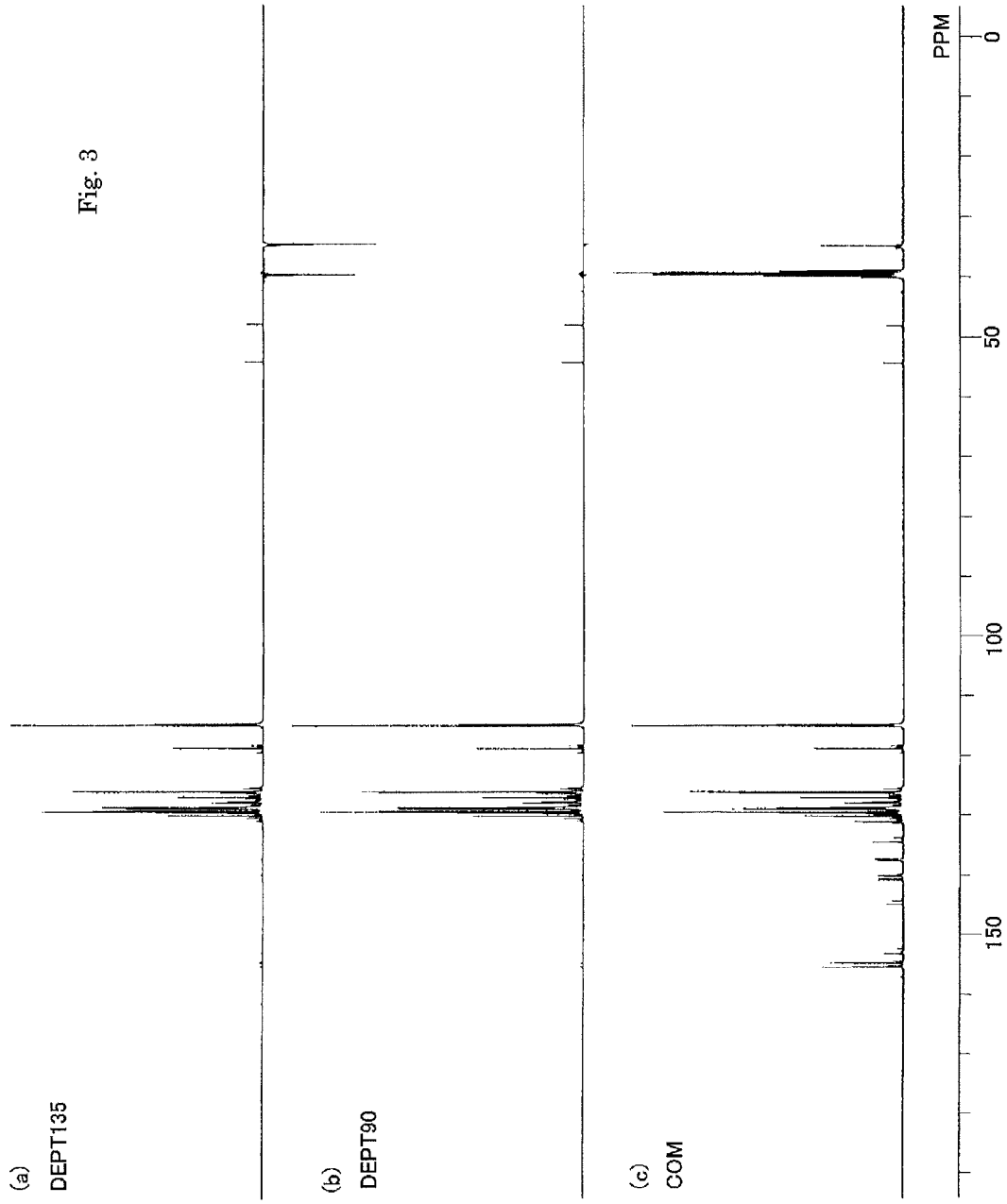

METHOD OF SEALING A SEMICONDUCTOR ELEMENT WITH AN EPOXY RESIN COMPOSITION

CROSS-REFERENCE TO RELATED APPLICATIONS

This application is a continuation of U.S. application Ser. No. 12/090,173 filed on Apr. 14, 2008, which is a U.S. national stage application of International Application No. PCT/JP2006/320581 filed on Oct. 16, 2006 and which claims priority to Japanese Application No. 2005-300126 filed on Oct. 14, 2005, the entire contents of all three of which are incorporated herein by reference.

TECHNICAL FIELD

The present invention relates to a phenolic resin useful for a molding material, various binders, a coating material, a laminating material or the like; a production method thereof; and an epoxy resin composition using as a curing agent for an epoxy resin them, or a cured substance thereof. In specifically, the present invention relates to a phenolic resin having flame retardance, fast curing property and low melt viscosity, which is useful for a curing agent for epoxy resin-based semiconductor sealing materials, and a production method thereof.

BACKGROUND ART

As a method for sealing a semiconductor, a resin-sealing with an epoxy resin is generally used in view of good balance of economical efficiency, productivity and physical properties, and among them, the resin-sealing composed of an o-cresol novolac-type epoxy resin and a phenol-novolac curing agent and an inorganic filler such as silica has been used widely. However, in recent years, with a larger size LSI chip, a thinner/more compact size package, and change of a packaging system or the like, performance required to a sealing material has been changed largely, and sufficient response by a conventional epoxy resin sealing material has become difficult, in respect to humidity resistance, heat resistance, reliability or the like. For example, in heat treatment in soldering, a present problem is generation of crack or peeling of a package accompanied with abrupt vaporization and expansion of absorbed moisture. In particular, with increasing use of lead-free solder in recent years, this problem has become increasingly serious. In addition, use of a bromine compound or an antimony compound, conventionally used as a flame retardant, has been reexamined from environmental problems.

Accordingly, there has been desired a development of an epoxy resin or a curing agent having low moisture absorption, low elastic modulus at soldering temperature and excellent adhesion properties. In addition, there has been desired a development of an epoxy resin or a curing agent difficult in combustion and has excellent flame retardance.

As a curing agent satisfying such requirements, there has been noticed a phenolic resin having a biphenyl skeleton derived from a 4,4'-bismethylbiphenyl compound and phenols (for example, see Patent References 1 and 2). However, an epoxy resin composition obtained by using such a phenolic resin as a curing agent, had a drawback having inferior curing property, as compared with an epoxy resin composition obtained by using a phenolaralkyl resin derived from a 4,4'-xylylene compound and a phenol as a curing agent. Still more, temperature of a kneading roll or a kneader in producing semiconductor sealing materials or the like is equal to or lower than 120° C., and temperature equal to or higher than this makes production of sealing materials difficult because of generation of a problem of viscosity increase or the like, caused by a reaction between an epoxy resin and a curing agent in kneading. Therefore, as a curing agent or an epoxy resin used in this application, one having a softening point of equal to or lower than 100° C., preferably equal to or lower than 80° C. is desirable. On the other hand, it is desired that melt viscosity is low at a molding temperature region of a curing agent or an epoxy resin, in order to maintain melt viscosity low in molding, even when a large quantity of inorganic fillers are compounded, which are essential to be compounded into semiconductor sealing materials. However, a phenolic resin having a biphenyl skeleton, described in the above documents, had a problem that by making average molecular weight smaller to lower melt viscosity, crystallization tends to occur more easily, resulting in abrupt increase in softening point.

Patent Reference 1: JP-A-2000-129092
Patent Reference 2: JP-A-2000-226498

DISCLOSURE OF INVENTION

Problems to be Solved by the Invention

Accordingly, the present inventors have studied a way to obtain a phenolic resin having improved curing property, viscosity characteristics, flame retardance or the like, without substantially impairing characteristics of a phenolic resin having the above biphenyl skeleton, and as a result, found that by the addition of a specific amount of an aromatic aldehyde in a reaction between 4,4'-bismethylbiphenyl compound and phenols, a phenolic resin with desired property can be obtained. Therefore, it is an object of the present invention to provide a phenolic resin having improved properties, a production method, and use thereof.

Means for Solving the Problems

That is, the present invention relates to a phenolic resin represented by the following general formula (1).

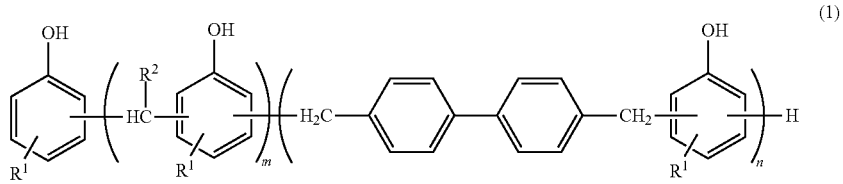

Wherein $R^1$ is a hydrogen and a $C_1$ to $C_6$ alkyl group or an aryl group, provided that each of $R^1$s of (m+n+1) may be the same or different. $R^2$ is an aryl group, provided that each of $R^2$s of m may be the same or different. And m and n are integer, provided that m+n is from 2 to 30, and m/n is from 5/95 to 50/50.

In addition, the present invention also relates to a phenolic resin obtained by reacting phenols represented by the following general formula (2), a biphenyl compound represented by the following general formula (3), and an aromatic aldehyde represented by the following general formula (4).

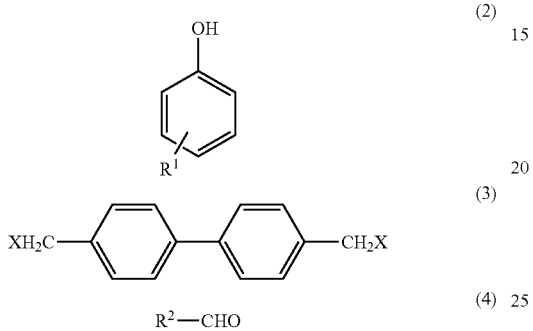

Wherein $R^1$ in the formula (2) is a hydrogen and a $C_1$ to $C_6$ alkyl group or an aryl group; X in the formula (3) is a halogen, an OH group or an $OCH_3$ group; and $R^2$ in the formula (4) is an aryl group. The above phenolic resin can be obtained by subjecting to a reaction preferably in a molar ratio of the total of the biphenyl compound and the aromatic aldehyde relative to the phenol of from 0.10 to 0.60, and in a ratio of the aromatic aldehyde/the biphenyl compound (reaction molar ratio) of from 5/95 to 50/50.

In the above reaction, in the case where X in the formula (3) is an OH group or an $OCH_3$ group, it can be carried out in the presence of an acid catalyst, and in the case where X in the formula (3) is a halogen, it can be carried out in the presence of water.

The present invention also relates to a curing agent for an epoxy resin composed of the above phenolic resin, and an epoxy resin composition containing the above phenolic resin and an epoxy resin, and still more an epoxy resin cured substance obtained by curing the same.

Advantages of the Invention

According to the present invention, there can be provided a phenolic resin having low softening point and low melt viscosity, which is useful for a molding material, various binders, a coating material, a laminating material or the like. Such a phenolic resin is particularly useful as a curing agent for epoxy resin, and in the case where it is used for semiconductor sealing, it is capable of forming an epoxy resin composition having low melt viscosity, fast curing property, low water absorbing property, high adhesion property, low elastic modulus at high temperature and excellent flame retardance.

BEST EMBODIMENT FOR CARRYING OUT THE INVENTION

In a phenolic resin represented by the above general formula (1), $R^1$ is a hydrogen and a $C_1$ to $C_6$ alkyl group, for example, a methyl group, an ethyl group, a n-propyl group, an isopropyl group, a n-butyl group, an isobutyl group, a t-butyl group, a n-pentyl, an isoamyl group, a t-amyl group, a n-hexyl group or the like; or an aryl group, for example, a phenyl group, a p-tolyl group or the like, provided that each of $R^1$s of (m+n+1) may be the same or different. In particular, one in which all of $R^1$s are hydrogens is preferable because raw materials are low cost, and show an excellent performance as a curing agent for an epoxy resin. In addition, in a phenolic resin represented by the above general formula (1), $R^2$ is an aryl group, provided that each of $R^2$s of m may be the same or different, for example, a phenyl group, a tolyl group, a naphthyl group, a biphenyl group or the like is included, and in particular, one having a phenyl group is preferable. In addition, in a phenolic resin represented by the above general formula (1), m and n are integer of 1 or larger, and it may be a mixture of two or more kinds having different value of m and/or n. In consideration of melt viscosity, one having an average value of m+n of from 2 to 30, preferable from 2 to 15 is preferable.

A phenolic resin represented by the above general formula (1) can be obtained by reacting phenols represented by the following general formula (2), a biphenyl compound represented by the following general formula (3) and an aromatic aldehyde represented by the following general formula (4):

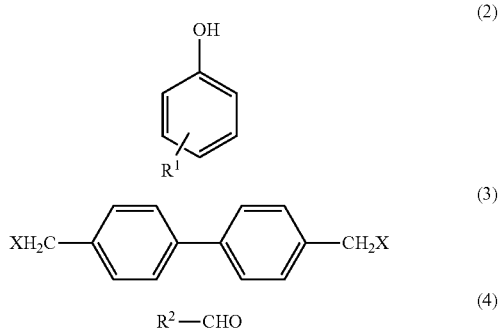

$R^1$ and $R^2$ in the above formulae (2) and (4) are the same as $R^1$ and $R^2$ in the above formula (1), and X in the above formula (3) is a halogen, an OH group or an $OCH_3$ group. In general, by the reaction of (2), (3) and (4), there are generated not only a phenolic resin represented by the general formula (1), but also phenolic resins corresponding to those having m=0 or n=0 in the general formula (1), therefore, in the case where a phenolic resin corresponding to the general formula (1) is desired to be obtained, they may be removed from the reaction products. However, even when the above reaction product (a phenolic resin), which contains phenolic resins corresponding to those having m=0 or n=0 in the general formula (1), is used as it is as a curing agent for an epoxy resin, an epoxy resin composition having desired performance can be obtained, therefore, the above removal operation is not required usually.

As phenols represented by the general formula (2), there are included specifically phenol; o-, m-, or p-cresol, ethylphenol, n-propylphenol, isopropylphenol, t-butylphenol, t-amylphenol, n-hexylphenol, phenylphenol, and the like. In particular, phenol is a suitable raw material.

In addition, in a biphenyl compound represented by the general formula (3), X is a halogen, for example, a chlorine, a bromine, an iodine; an OH group or an $OCH_3$ group, and specifically, 4,4'-bischloromethylbiphenyl, 4,4'-bisbromomethylbiphenyl, 4,4'-bisiodomethylbiphenyl, 4,4'-bishydroxymethylbiphenyl, 4,4'-bismethoxymethylbiphenyl, or the like is exemplified.

Still more, as an aromatic aldehyde represented by the general formula (4), there is included specifically benzaldehyde, p-tolualdehyde, naphthylaldehyde, biphenylaldehyde or the like. It is particularly preferable to use benzaldehyde.

In the reaction of the above (2), (3) and (4), in order to obtain a phenolic resin having suitable molecular weight and excellent performance as a curing agent for an epoxy resin, it is preferable to carry out the reaction in a molar ratio of the total of the biphenyl compound and the aromatic aldehyde relative to the phenol of from 0.10 to 0.60, preferably from 0.15 to 0.40, and in a ratio of the aromatic aldehyde/the biphenyl compound (reaction molar ratio) of from 5/95 to 50/50, preferably from 10/90 to 55/45. The above reaction can be carried out at a temperature of from about 60 to 150° C. for from about 1 to 10 hours, in the presence or absence of a catalyst. That is, in the case where X in the formula (3) is an OH group or an $OCH_3$ group, the reaction is necessary to be carried out in the presence of an acid catalyst, and in the case where X in the formula (3) is halogen, the reaction can be initiated in the presence of trace amount of water, and in addition, the reaction can be progressed by a hydrogen halide generating by the reaction.

As an acid catalyst that can be used in the above reaction, an inorganic acid such as phosphoric acid, sulfuric acid, hydrochloric acid; an organic acid such as oxalic acid, benzene sulfonic acid, toluene sulfonic acid, methane sulfonic acid, fluoromethane sulfonic acid; and a Friedel-Crafts catalyst such as zinc chloride, stannic chloride, ferric chloride, diethyl sulfate may be used alone or in combination. In the case where a phenolic resin of a reaction product is used in an electronics material application such as semiconductor sealing, presence of acid residue is not preferable; therefore, use of hydrochloric acid as the acid catalyst is preferable, because hydrogen halide can be removed easily from a condensation reaction mixture under reduced pressure.

By removing unreacted raw materials (for example, phenols), reaction byproducts (for example, hydrogen halides or methanol) the catalyst (for example, hydrochloric acid) or the like from a condensation reaction mixture obtained by the above condensation reaction, under reduced pressure, a phenolic resin, which is a reaction product, can be separated. In such a reaction product, as described above, phenolic resins corresponding to those having m=0 or n=0 in the general formula (1) are included, as well as a phenolic resin represented by the general formula (1). By removing a part of or all parts of the phenolic resins corresponding to those having m=0 or n=0 in the general formula (1), from such a reaction product, purity of the phenolic resin represented by the general formula (1) can be increased. However, even when a phenolic resin, which is the above reaction product, is used as it is, desired performance can be shown as a curing agent for an epoxy resin, therefore, the above operation for enhancing purity is not usually required. As for average composition in such a mixed phenolic resin, according to charging ratio of raw materials, in the general formula (1), there is obtained one having a range of ratio of m and n of from 5/95 to 50/50, preferably from 10/90 to 55/45; and in addition, average value of m is from 0.05 to 2.5, preferably from 0.2 to 1.2; average value of n is from 0.7 to 5.0, preferably from 1.1 to 2.6; average value of m+n is from 1.1 to 7.0, preferably from 1.1 to 5.0; and average value of m/average value of n is in a range of from 5/95 to 50/50, preferably from 10/90 to 40/60. In addition, ICI melt viscosity at 150° C. is in a range of from 10 to 200 mPa·s, preferably from 50 to 180 mPa·s. In addition, because the above separation operation under reduced pressure, which is carried out in order to remove unreacted raw materials and the like in the above reaction product, is usually carried out at a temperature of equal to or higher than 130° C., by quenching and solidifying the reaction product in a melt state obtained by said operation as it is, isolation as an amorphous solid having a softening point (JIS K2207) of from about 50 to 80° C. can be possible.

A phenolic resin, which is the above reaction product obtained in this way, generally has excellent transparency, low melt viscosity at a molding temperature region and excellent processing performance. Therefore, it can be used as a molding material, various binders, a coating material, a laminating material or the like. It is particularly useful for a curing agent for epoxy resin, and in the case where it is used as a curing agent in epoxy resin-based semiconductor sealing materials, it is capable of providing an epoxy resin composition having fast curing property, as well as low moisture absorbing property, low elastic modulus at high temperature, high adhesion property, and excellent flame retardance.

As an epoxy resin that can be used with the above phenolic resin in the above epoxy resin composition, there is included, for example, an epoxy resin having two or more epoxy groups in a molecule, for example, a glycidyl ether-type epoxy resin such as a bisphenol A-type epoxy resin, a bisphenol F-type epoxy resin, a cresol novolac-type epoxy resin, a phenol novolac-type epoxy resin, a biphenyl-type epoxy resin, a phenolbiphenylaralkyl-type epoxy resin, an epoxidated substance of an aralkyl resin having xylylene bonding formed by phenol, naphthol or the like; a dicyclopentadiene-type epoxy resin, a dihydroxynaphthalene-type epoxy resin, a triphenolmethane-type epoxy resin or the like; a glycidyl ester-type epoxy resin; and a glycidylamine-type epoxy resin. These epoxy resins may be used alone or in combination. In consideration of humidity resistance, low elastic modulus at high temperature, flame retardance or the like, it is preferable to use a multifunctional-type epoxy resin having many aromatic rings selected from a two-functional epoxy resin such as a bisphenol F-type epoxy resin, a biphenyl-type epoxy resin; a phenolbiphenylaralkyl-type epoxy resin; and an epoxidated substance of an aralkyl resin having xylylene bonding formed by phenol, naphthol or the like.

In curing of an epoxy resin, it is preferable to use a curing accelerator in combination. As such a curing accelerator, a known curing accelerator to cure an epoxy resin with a phenol resin-based curing agent can be used, and for example, there is included a tertiary amine, a quaternary ammonium salt, imidazoles and a tetraphenyl borate thereof, an organic phosphine compound and borate thereof, and a quaternary phosphonium salt or the like. In more specifically, there is included a tertiary amine such as triethylamine, triethylenediamine, benzyldimethylamine, 2,4,6-tris(dimethylaminomethyl)phenol, 1,8-diazabicyclo(5,4,0)undecene-7; an imidazole such as 2-methylimidazole, 2,4-dimethylimidazole, 2-ethyl-4-methylimidazole, 2-phenylimidazole, 2-phenyl-4-methylimidazole; an organic phosphine compound such as triphenylphosphine, tributylphosphine, trip-methylphenyl)phosphine, tri (nonylphenyl)phosphine; tetraphenylphosphonium tetraphenylborate, tetraphenylphosphonium tetranaphthoic acid borate or the like. Among these, in view of low water absorption property or reliability, an organic phosphine compound, or a quaternary phosphonium quaternary borate is preferable.

Into an epoxy resin composition of the present invention, an inorganic filler, a coupling agent, a mold releasing agent, a colorant, a flame retardant, a flame retardant auxiliary, a low stress agent or the like may be used, if necessary, by the addition or reaction in advance. In addition, other curing agents may be used in combination. As an example of such other curing agents, there are included a phenol novolac resin, a phenolaralkyl resin, a phenolbiphenylaralkyl resin, a phenolnaphthylaralkyl resin, a naphtholaralkyl resin, a triphenolmethane-type novolac resin and the like.

In the case where the above epoxy resin composition is used for semiconductor sealing, the addition of an inorganic filler is essential. As an example of such an inorganic filler, there is included amorphous silica, crystalline silica, alumina, glass, calcium silicate, gypsum, calcium carbonate, magnesite, caly, talc, mica, magnesia, barium sulfate or the like, and in particular, amorphous silica, crystalline silica or the like is preferable. In addition, it is preferable to use a spherical filler having wide size distribution, so as to enable closest packing, in order to increase compounding amount of the filler while maintaining excellent moldability.

As an example of the coupling agent, there is exemplified a silane coupling agent such as a mercaptosilane-type, a vinylsilane-type, an aminosilane-type or an epoxysilane-type, or a titanium-type agent; as an example of a mold releasing agent, carnauba wax, paraffin wax, stearic acid, montanoic acid, polyolefin wax having a carboxyl group or the like; and as a colorant, carbon black or the like. As an example of a flame retardant, there is included a halogenated epoxy resin, a halogen compound, a phosphorus compound or the like; and in addition, as an example of a flame retardant auxiliary, antimony trioxide or the like is included. As an example of the low stress agent, silicone rubber, modified nitrile rubber, modified butadiene rubber, modified silicone oil or the like is included.

As for compounding ratio of an phenolic resin of the present invention and an epoxy resin, in consideration of heat resistance, mechanical characteristics or the like, equivalent ratio of a hydroxide group/an epoxy group is preferably in a range of from 0.5 to 1.5, in particular, from 0.8 to 1.2. In addition, even in the case of combined use of other curing agents, it is preferable that equivalent ratio of a hydroxide group/an epoxy group is set so as to be the above ratio. It is preferable that a curing accelerator is used in a range of from 0.1 to 5 parts by weight relative to 100 parts by weight of the epoxy resin, in consideration of curing characteristics or various properties. Still more, in an epoxy resin composition for semiconductor sealing, it is preferable that an inorganic filler is compounded so as to occupy a ratio of from 60 to 93% by weight in total composition, in consideration of soldering heat resistance, moldability (melt viscosity, fluidity), low stress property, low water absorption property or the like, although it differs a little depending on kind of the inorganic filler.

As a general method in the case of preparation of an epoxy resin composition as a molding material, there is included a method for sufficiently mixing each of raw materials in predetermined ratio, for example, by a mixer, and then adding kneading treatment by using a heated roll or a kneader or the like, and still more by cooling and solidification, followed by crushing to a suitable size and tablet making, if necessary, or the like. A molding material obtained in this way can be used for sealing a semiconductor, for example, by transfer molding at low pressure to manufacture a semiconductor device. Curing of an epoxy resin composition can be carried out at a temperature range of, for example, from 100 to 250° C.

EXAMPLES

Example 1

Into a four-neck flask equipped with a discharging spout at the lower part, 582.6 g (6.20 moles) of phenol, 420.0 g (1.67 moles) of 4,4'-dichloromethylbiphenyl and 19.7 g (0.19 mole) of benzaldehyde were charged, and temperature was raised and the inside of the system became a slurry state at 70° C. and an uniformly dissolved state at 78° C. to start generation of HCl. The system was maintained at 80° C. for 3 hours, and still more subjected to heat treatment at 150° C. for 1 jour. HCl generating from a reaction was vaporized outside as it is, and trapped in alkali water. In this stage, there was no residue of unreacted 4,4'-dichloromethylbiphenyl and benzaldehyde, and it was confirmed with gas chromatography that they were all reacted. After completion of the reaction, by subjecting the system to reduced pressure, HCl and unreacted phenol remained inside the system were removed exterior of the system. By treating the system under reduced pressure finally down to 30 torr at 150° C., residual phenol became not detected any more with gas chromatography. This reaction product was drawn out while maintaining at 150° C., to yield 594.0 g of a pale brown-yellowish transparent (without turbidity caused by crystallization) phenolic resin (1).

Softening point, based on JIS K2207, of this phenolic resin (1) was 75° C. In addition, melt viscosity at 150° C., measured with an ICI melt viscometer, was 120 mPa·s. Still more, equivalent amount of a hydroxyl group, measured by an acetylation back titration method, was 208 g/eq.

A chart obtained by molecular weight measurement on the phenolic resin (1) by an FD-MS method, by using a JMS-700 high resolution mass detector manufactured by JEOL Ltd., is shown in FIG. 1. In addition, the phenolic resin (1) was dissolved into deuterated dimethylsulfoxide to carry out $^{13}$C-NMR measurement. A usual $^{13}$C-NMR spectrum is shown in FIG. 2. In addition, among DEPT methods, which are capable of specifying kind of carbon-atom groups, a spectrum of DEPT135 and a spectrum of DEPT90 are each shown in FIG. 3(a) and in FIG. 3(b), as well as a spectrum of FIG. 2 was shown also in FIG. 3(c), to make comparison easier. Incidentally, measurement conditions of $^{13}$C-NMR were as follows.

Apparatus: JNM-ECA400 superconduction FT-NMR apparatus, manufactured by JEOL Ltd.
Nucleus measured: $^{13}$C
Measurement Method:
Usual method: Proton complete decoupling method
DEPT method: DEPT90 and DEPT135
Pulse Width:
Carbon 90° pulse: 10 microseconds (observation side)
Proton 90° pulse: 11 microseconds (irradiation side)
Measurement temperature: 40° C.

A peak at the vicinity of from 35 to 55 ppm in FIG. 2 is one derived from an aliphatic structure, and a peak at the vicinity of from 115 to 156 ppm is one derived from an unsaturated structure. In addition, in FIG. 3, among upward peaks in DEPT135, a peak not appearing in DEPT90 is derived from a methyl group; a downward peak in DEPT135 is derived from a methylene group; an upward peak in DEPT90 is derived from a methine group; and among usual spectra, one not appearing in any of upward and downward in DEPT135 is one derived from a quaternary carbon. FIG. 2 and FIG. 3 provided analysis result supporting strongly a chemical structure represented by FIG. 1, in such a way that the phenolic resin (1) has no methyl groups present, it is composed of a methylene group, methine group and a quaternary carbon; a quaternary carbon is not observed in an aliphatic region and it is quaternary carbon having an unsaturated structure; and a methylene group is observed only in an aliphatic region and it is an aliphatic methylene group; or the like.

It was clarified, from these structural analysis and molecular weight peaks in FIG. 1, that, in the phenolic resin (1), $R^1$ and $R^2$ in the general formula (1) correspond to hydrogen, and there are included a polymer (molecular weight 548) with m=1 and n=1; a polymer (molecular weight 730) with m=2 and n=1; a polymer (molecular weight 820) with m=1 and n=2; a polymer (molecular weight 1002) with m=2 and n=2; a polymer (molecular weight 1092) with m=1 and n=3; a polymer (molecular weight 1274) with m=2 and n=3; a polymer (molecular weight 1365) with m=1 and n=4; as well as various polymers corresponding to m=0 and n=1 or more (molecular weight 366, 638, 910, 1182, 1455), and n=0 and m=1 or more (molecular weight 276, 458).

Example 2

By carrying out in the same manner as in Example 1, except that charging amount of phenol was 624.2 g (6.64 moles), charging amount of 4,4'-dichloromethylbiphenyl was 350.0 g (1.39 moles) and charging amount of benzaldehyde was 63.3 g (0.60 mole), 598.3 g of a pale brown-yellowish transparent (without turbidity caused by crystallization) phenolic resin (2) was obtained.

Softening point, based on JIS K2207, of this phenolic resin (2) was 79° C. In addition, melt viscosity at 150° C., measured with an ICI melt viscometer, was 120 mPa·s. Still more, equivalent amount of a hydroxyl group, measured by an acetylation back titration method, was 191 g/eq.

Example 3

By carrying out in the same manner as in Example 1, except that charging amount of phenol was 661.5 g (7.04 moles), charging amount of 4,4'-dichloromethylbiphenyl was 340.0 g (1.35 moles) and charging amount of benzaldehyde was 61.5 g (0.58 mole), 592.0 g of a pale brown-yellowish transparent (without turbidity caused by crystallization) phenolic resin (3) was obtained.

Softening point, based on JIS K2207, of this phenolic resin (3) was 76° C. In addition, melt viscosity at 150° C., measured with an ICI melt viscometer, was 100 mPa·s. Still more, equivalent amount of a hydroxyl group, measured by an acetylation back titration method, was 201 g/eq.

Example 4

By carrying out in the same manner as in Example 1, except that charging amount of phenol was 641.5 g (6.82 moles), charging amount of 4,4'-dichloromethylbiphenyl was 370.0 g (1.47 moles) and charging amount of benzaldehyde was 17.4 g (0.16 mole), 535.1 g of a pale brown-yellowish transparent (without turbidity caused by crystallization) phenolic resin (4) was obtained.

Softening point, based on JIS K2207, of this phenolic resin (4) was 71° C. In addition, melt viscosity at 150° C., measured with an ICI melt viscometer, was 80 mPa·s. Still more, equivalent amount of a hydroxyl group, measured by an acetylation back titration method, was 198 g/eq.

Example 5

By carrying out in the same manner as in Example 1, except that charging amount of phenol was 668.8 g (7.11 moles), charging amount of 4,4'-dichloromethylbiphenyl was 300.0 g (1.19 moles) and charging amount of benzaldehyde was 54.3 g (0.51 mole), 529.5 g of a pale brown-yellowish transparent (without turbidity caused by crystallization) phenolic resin (5) was obtained.

Softening point, based on JIS K2207, of this phenolic resin (5) was 73° C. In addition, melt viscosity at 150° C., measured with an ICI melt viscometer, was 70 mPa·s. Still more, equivalent amount of a hydroxyl group, measured by an acetylation back titration method, was 191 g/eq.

Example 6

By carrying out in the same manner as in Example 1, except that charging amount of phenol was 702.2 g (7.47 moles), charging amount of 4,4'-dichloromethylbiphenyl was 225.0 g (0.90 mole) and charging amount of benzaldehyde was 95.0 g (0.90 mole), 524.4 g of a pale brown-yellowish transparent (without turbidity caused by crystallization) phenolic resin (6) was obtained.

Softening point, based on JIS K2207, of this phenolic resin (6) was 76° C. In addition, melt viscosity at 150° C., measured with an ICI melt viscometer, was 70 mPa·s. Still more, equivalent amount of a hydroxyl group, measured by an acetylation back titration method, was 178 g/eq.

Example 7

An epoxy resin A represented by the following general formula (5):

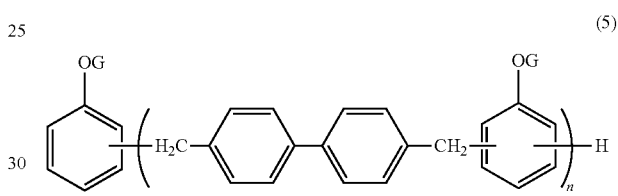

(5)

(wherein G is a glycidyl group; and n is a number of from 1 to 10) (biphenylaralkyl-type resin, NC-3000P, with an equivalent weight of an epoxy group of 272 g/eq, produced by Nippon Kayaku Co., Ltd.), the phenolic resin (1) obtained in Example 1, fused silica and a phosphorous-type curing accelerator (2-(triphenylphosphonio)phenolate) were compounded in a ratio shown in Table 1, and after sufficient mixing, they were subjected to two-roll kneading at 85° C.±3° C. for 3 minutes, then cooled and crushed to yield a composition for molding. This composition for molding was molded by using a transfer molding machine at 175° C. for 2 minutes under a pressure of 100 kgf/cm$^2$, and then subjected to post curing at 180° C. for 6 hours to yield test pieces for testing water absorption rate, flexural modulus, glass transition temperature (Tg) and flame retardance.

Properties of these molding materials were measured by the following methods.
(1) Water Absorption Rate Water absorption rate was measured by subjecting a circular disk with a sample shape of 50 mm diameter×3 mm, to water absorption at 85° C. for 168 hours under atmosphere of a relative humidity of 85%.

Water absorption rate (%)=(increased weight amount after treatment/weight before treatment)×100

(2) Flexural Modulus

Flexural modulus was measured at 260° C., according to JIS K6911, after standing still a rectangular strip with a sample shape of 80×10×4 mm, in atmosphere of 260° C. for 10 minutes.
(3) Glass Transition Temperature (Tg)

Linear expansion coefficient was measured by TMA under condition of a temperature raising rate of 5° C./minute, and Tg was determined as an inflexion point of the linear expansion coefficient.

(4) Flame Retardance

By using a sample with a thickness of 1.6 mm, a width of 10 mm and a length of 135 mm, flame retardance was evaluated by measurement of after flame time according to UL-V94.

These evaluation results are shown in Table 1.

Example 8

A composition for molding was prepared in the same manner as in Example 7 except that the phenolic resin (2) obtained in Example 2 was used instead of the phenolic resin (1) obtained in Example 1, and compounding ratio was set as shown in Table 1, and evaluation thereof was carried out. The results are written down together in Table 1.

Example 9

A composition for molding was prepared in the same manner as in Example 7 except that the phenolic resin (3) obtained in Example 3 was used instead of the phenolic resin (1) obtained in Example 1, and compounding ratio was set as shown in Table 1, and evaluation thereof was carried out. The results are written down together in Table 1.

Example 10

A composition for molding was prepared in the same manner as in Example 7 except that the phenolic resin (4) obtained in Example 4 was used instead of the phenolic resin (1) obtained in Example 1, and compounding ratio was set as shown in Table 1, and evaluation thereof was carried out. The results are written down together in Table 1.

Example 11

A composition for molding was prepared in the same manner as in Example 7 except that the phenolic resin (5) obtained in Example 5 was used instead of the phenolic resin (1) obtained in Example 1, and compounding ratio was set as shown in Table 1, and evaluation thereof was carried out. The results are written down together in Table 1.

Comparative Example 1

A composition for molding was prepared in the same manner as in Example 7 except that a phenolbiphenylaralkyl resin (having an ICI melt viscosity at 150° C., measured by an ICI melt viscometer, of 90 mPa·s, and an equivalent weight of a hydroxyl group of 205 g/eq) represented by the following general formula (6) (wherein n is a number of from 1 to 10), was used instead of the phenolic resin (1) obtained in Example 1 and compounding ratio was set as shown in Table 1, and evaluation thereof was carried out. The results are written down together also in Table 1.

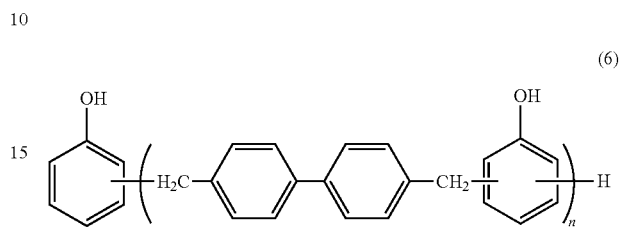

(6)

Comparative Example 2

A composition for molding was prepared in the same manner as in Example 7 except that a phenolaralkyl resin (having an ICI melt viscosity at 150° C., measured by an ICI melt viscometer, of 90 mPa·s, and an equivalent weight of a hydroxyl group of 168 g/eq) represented by the following general formula (7) (wherein n is a number of from 1 to 10), was used instead of the phenolic resin (1) obtained in Example 1, and compounding ratio was set as shown in Table 1, and evaluation thereof was carried out. The evaluation results are shown in Table 1.

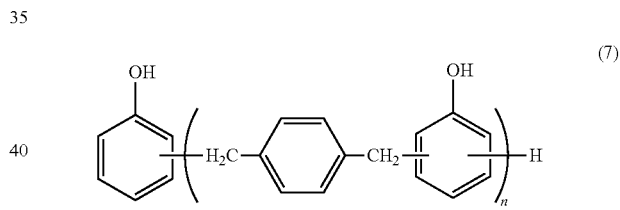

(7)

TABLE 1

| | Examples | | | | | Comparative Examples | |
|---|---|---|---|---|---|---|---|
| | 7 | 8 | 9 | 10 | 11 | 1 | 2 |
| Raw materials (parts by weight) | | | | | | | |
| Epoxy resin (A) | 85.0 | 86.8 | 85.0 | 85.5 | 87.7 | 84.8 | 91.8 |
| Phenolic resin (1) | 62.8 | | | | | | |
| Phenolic resin (2) | | 61.0 | | | | | |
| Phenolic resin (3) | | | 62.8 | | | | |
| Phenolic resin (4) | | | | 62.2 | | | |
| Phenolic resin (5) | | | | | 60.0 | | |
| Phenolbiphenylaralkyl resin | | | | | | 63.0 | |
| Phenolaralkyl resin | | | | | | | 56.4 |
| Curing accelerator | 2.25 | 2.25 | 2.25 | 2.25 | 2.25 | 2.25 | 2.25 |
| Silica | 850 | 850 | 850 | 850 | 850 | 850 | 850 |
| Molding curing property/ Fluidity | | | | | | | |
| Gelation time (sec) | 34 | 38 | 36 | 40 | 39 | 37 | 36 |
| Torque (175° C., 60 sec) kgf · cm | 8.6 | 9.4 | 9.4 | 4.2 | 3.9 | 6.0 | 8.5 |
| Torque (175° C., 90 sec) kgf · cm | 16.7 | 17.3 | 17.4 | 12.2 | 12.6 | 13.9 | 17.4 |

TABLE 1-continued

|  | Examples | | | | | Comparative Examples | |
| --- | --- | --- | --- | --- | --- | --- | --- |
|  | 7 | 8 | 9 | 10 | 11 | 1 | 2 |
| Torque (175° C., 300 sec) kgf · cm | 21.6 | 22.0 | 21.9 | 19.2 | 19.9 | 19.8 | 24.7 |
| Viscosity (175° C., Flow tester) Pa · s | 21 | 19 | 17 | 17 | 14 | 17 | 19 |
| Property of cured substance | | | | | | | |
| Glass transition temp. (° C.) | 124 | 125 | 124 | 121 | 122 | 120 | 117 |
| Flexural strength (MPa) | 22 | 28 | 22 | 22 | 20 | 24 | 24 |
| Flexural modulus (MPa) | 430 | 460 | 430 | 410 | 400 | 430 | 520 |
| Flame retardance evaluation | | | | | | | |
| Fmax (sec) | 9 | 8 | 6 | 8 | 7 | 9 | 19 |
| Ftotal (sec) | 49 | 48 | 47 | 49 | 48 | 50 | 91 |
| Judgement | V-0 | V-0 | V-0 | V-0 | V-0 | V-0 | V-1 |

It is understood by comparison between Examples 7 to 11, and Comparative Example 1, that those of Examples 7 to 11 are more excellent in either of curing property in molding or fluidity, as compared with one in Comparative Example 1, and in addition, those of Examples 7 to 11 have higher glass transition temperature, as well as shorter after flame time, as compared with one in Comparative Example 1. In addition, those of Examples 7 to 11 have higher glass transition temperature, and more excellent flame retardance, as compared with an example where a phenolaralkyl resin of Comparative Example 2 is used as a curing agent.

BRIEF DESCRIPTION OF THE DRAWINGS

FIG. 3 is each spectrum of (a) DEPT135, (b) DEPT90 and (c) usual method, in a $^{13}$C-NMR spectrum of the above phenolic resin (1).

Figure 1:
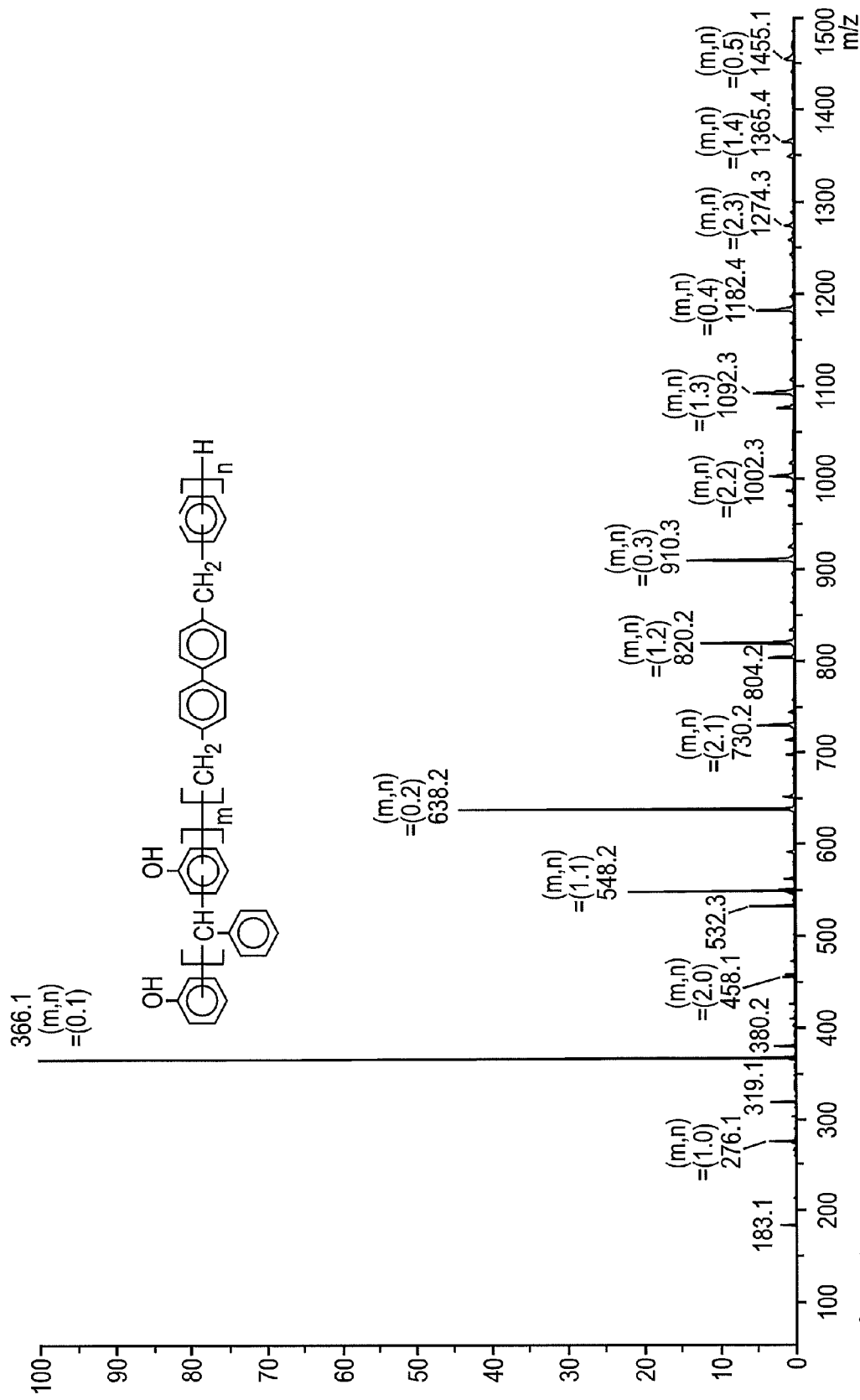
FIG. 1 is a weight spectrum of the phenolic resin (1) obtained in Example 1.
Figure 2:
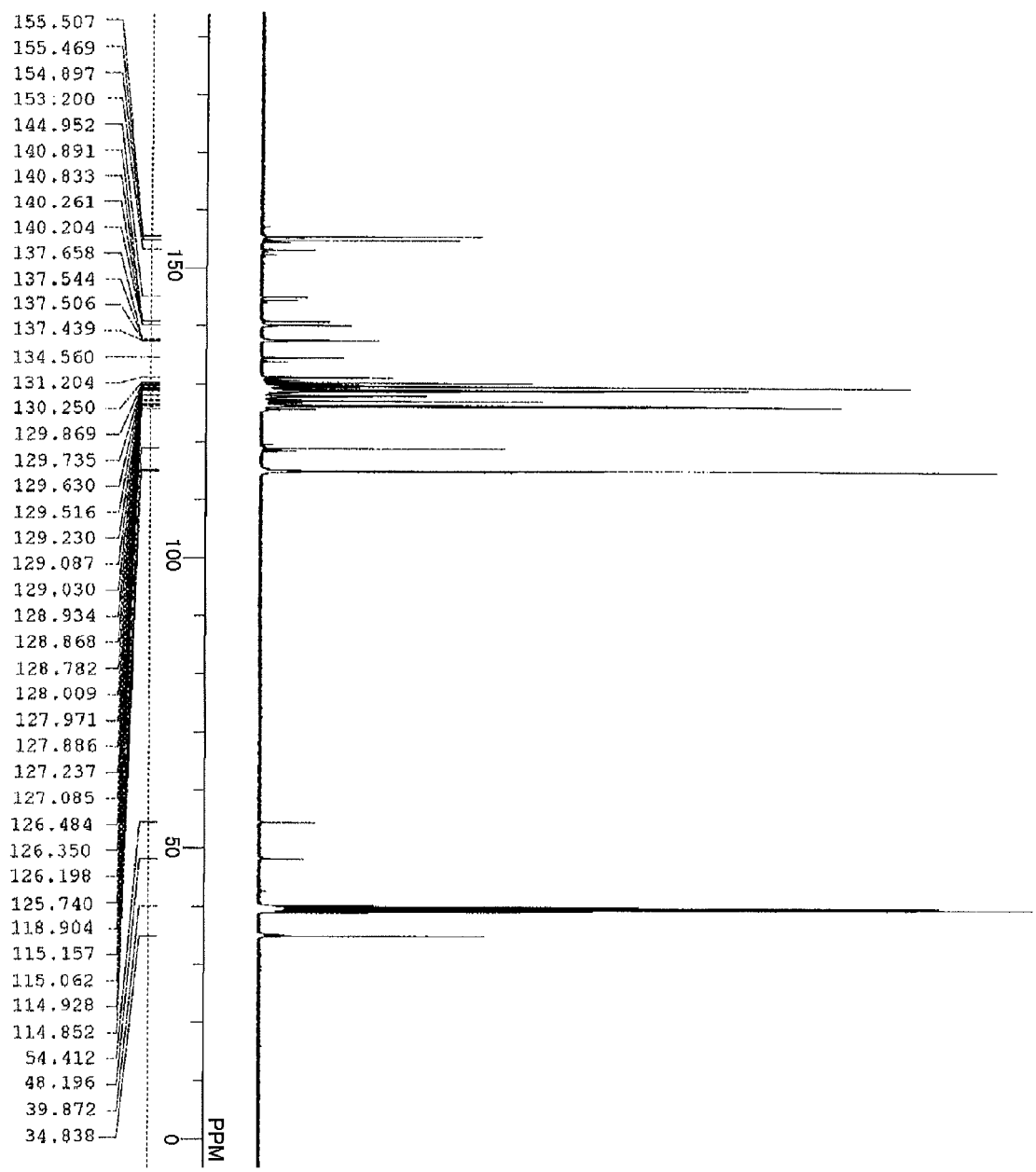
FIG. 2 is a $^{13}$C-NMR spectrum of the above phenolic resin (1).

The invention claimed is:

1. A method of sealing a semiconductor element which comprises applying an epoxy resin composition comprised of an epoxy resin and a phenolic resin obtained by reacting phenol, a biphenyl compound represented by the following general formula (3) and benzaldehyde to a semiconductor element and curing the composition to seal the semiconductor element:

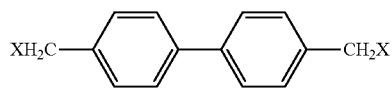

(3)

wherein X in the formula (3) is a halogen, an OH group or an OCH$_3$ group and wherein a molar ratio of the total of the biphenyl compound and benzaldehyde relative to the phenol is from 0.27 to 0.40, and a molar ratio of benzaldehyde/biphenyl compound is from 5/95 to 40/60.

2. The method of sealing a semiconductor element according to claim 1, wherein the phenolic resin has an ICI melt viscosity at 150° C. of from 10 to 200 mPa·s.

3. The method of sealing a semiconductor element according to claim 1, wherein the phenol, the biphenyl compound represented by the above general formula (3) and benzaldehyde are subjected to a reaction in the presence of an acid catalyst, provided that X in the formula (3) is an OH group or an OCH$_3$ group.

4. The method of sealing a semiconductor element according to claim 1, wherein the phenol, the biphenyl compound represented by the above general formula (3) and benzaldehyde are subjected to a reaction in the presence of water, provided that X in the formula (3) is a halogen.

5. The method of sealing a semiconductor element according to claim 1, wherein the epoxy resin composition further comprised of an inorganic filler.

6. The method of sealing a semiconductor element according to claim 5, wherein the inorganic filler is at least one selected from the group consisting of amorphous silica, crystalline silica, alumina, glass, calcium silicate, gypsum, calcium carbonate, magnesite, talc, mica, magnesia and barium sulfate.

7. The method of sealing a semiconductor element according to claim 1, wherein the epoxy resin is at least one kind of epoxy resin having two or more epoxy groups in a molecule.

8. The method of sealing a semiconductor element according to claim 1, wherein equivalent ratio of a hydroxide group of the phenolic resin/an epoxy group of the epoxy resin is in a range of from 0.5 to 1.5.

9. The method of sealing a semiconductor element according to claim 1, wherein the curing of an epoxy resin composition is carried out at a temperature range of from 100 to 250° C.

10. The method of sealing a semiconductor element according to claim 1, wherein the curing of an epoxy resin composition is carried out in the presence of a curing accelerator.

* * * * *